Nov. 1, 1932.  C. B. STRANDGREN  1,885,640
TURBINE WHEEL PROPELLER AND MOTOR
Filed Oct. 21, 1930   3 Sheets-Sheet 1

Nov. 1, 1932. C. B. STRANDGREN 1,885,640
TURBINE WHEEL PROPELLER AND MOTOR
Filed Oct. 21, 1930 3 Sheets-Sheet 2
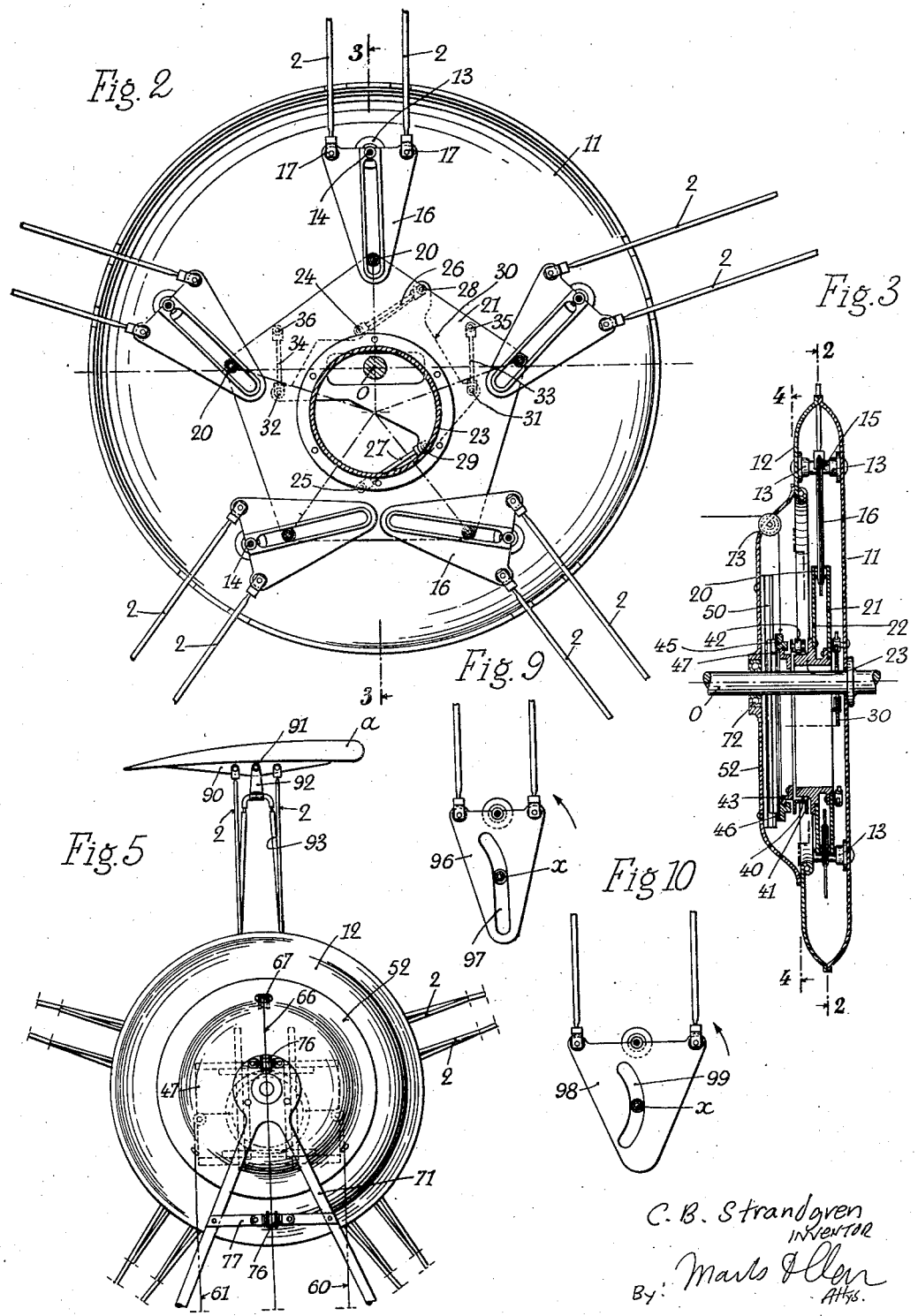

Nov. 1, 1932.  C. B. STRANDGREN  1,885,640
TURBINE WHEEL PROPELLER AND MOTOR
Filed Oct. 21, 1930  3 Sheets-Sheet 3
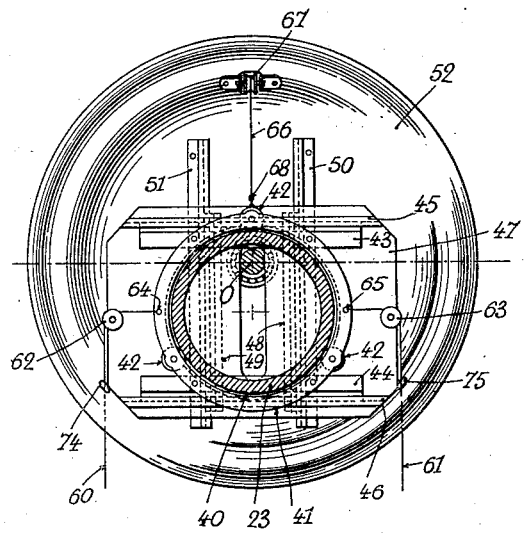
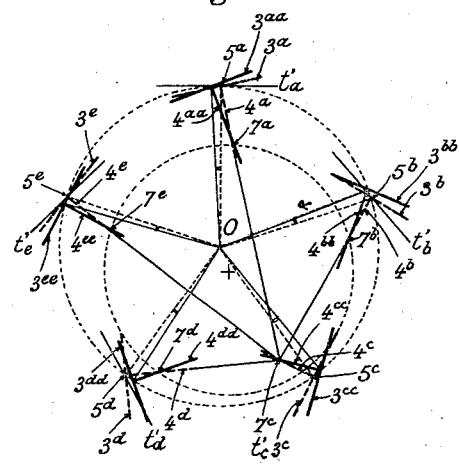
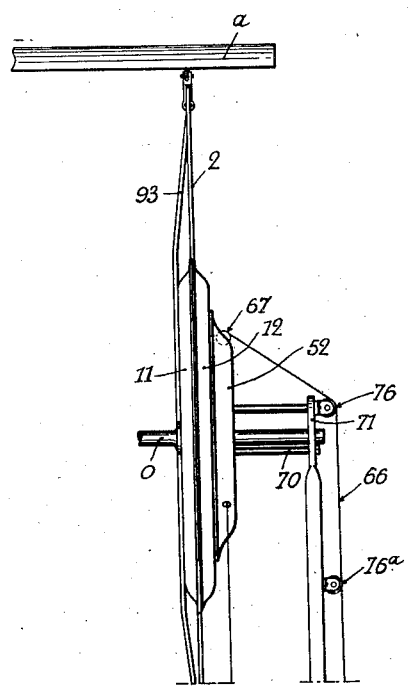
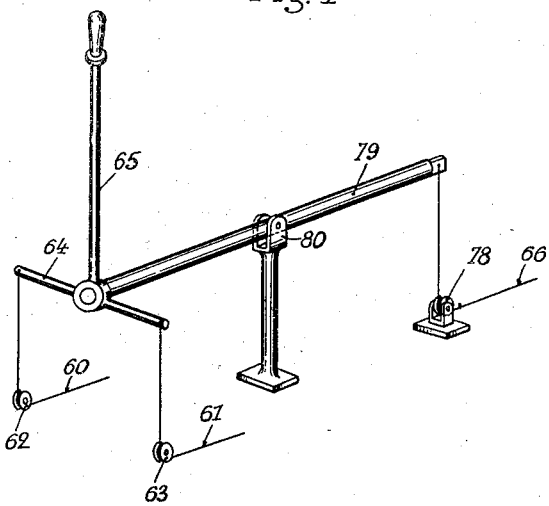
C. B. Strandgren
INVENTOR
By Marks & Clerk
ATTYS Patented Nov. 1, 1932

1,885,640

UNITED STATES PATENT OFFICE

CARL BRUNO STRANDGREN, OF VERSAILLES, FRANCE

TURBINE WHEEL PROPELLER AND MOTOR

Application filed October 21, 1930, Serial No. 490,266, and in France November 20, 1929.

The present invention relates to turbine wheels with an oscillating or feathering wings, paddles or the like, which may be used as a prime mover in a fluid in motion, or as a propelling and/or lifting device upon a vehicle travelling in a fluid.

The invention particularly relates to a new arrangement for controlling the oscillation of the wings, and causing the normals to the operative surface of the wings to meet at a fixed point with reference to the axis of the wheel, in such manner that the wings will have at all times a suitable angle of incidence with reference to the tangent to their trajectory; the invention has for its object to simplify and improve the mechanism required to obtain this result, as well as the device by which the character of the oscillation can be varied in operation.

The invention will be described with reference to the accompanying drawings, in which:

Fig. 2 is a cross-section on the line 2—2 of Fig. 3, showing the mechanism for controlling the oscillation of the wings.

Fig. 3 is a section on the line 3—3 of Fig. 2, showing the general arrangement of the mechanism and its casing.

Fig. 4 is a section on the line 4—4 of Fig. 3, showing the mechanism for varying the character of oscillation of the wings.

Fig. 5 is an elevational view on a smaller scale, corresponding to Fig. 2.

Fig. 6 is a side view corresponding to Fig. 5.

Fig. 7 shows the actuating device by which the mechanism shown in Fig. 4 is controlled by the pilot.

Fig. 8 is a diagram showing the principle of a modified form of the invention.

Figs. 9 and 10 show details of a modified construction.

Figure 1:
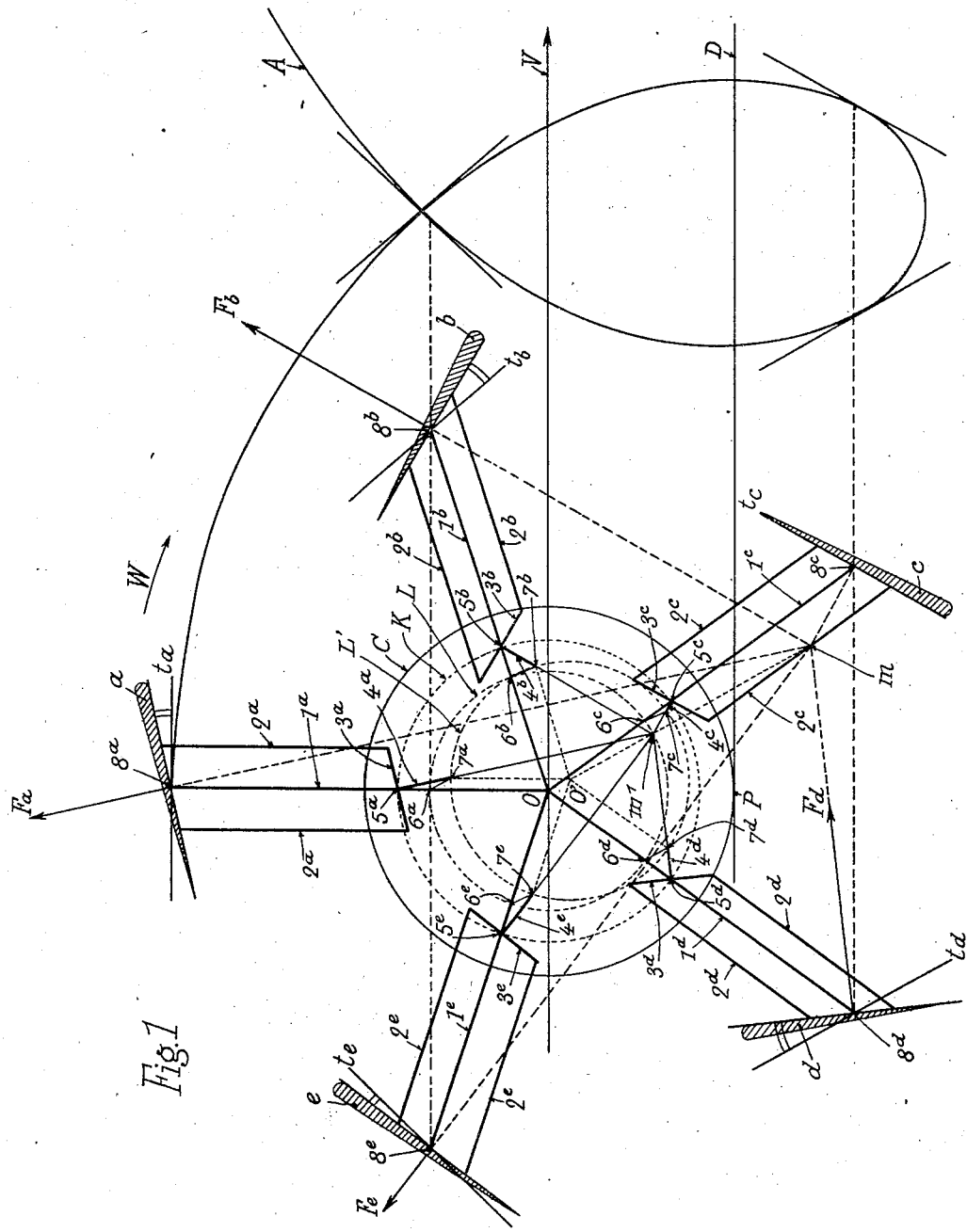
Fig. 1 is a diagrammatic view showing the principle of the wheel according to the invention.

Referring to Fig. 1, O is a rotatable shaft which is movable in a fluid on a straight path in a transverse direction, at a speed V. To said shaft is secured a rotary member embodying several arms $1^a$, $1^b$ ... $1^e$ of equal length (five in number in the present case), and at the end of each arm is pivotally mounted a respective wing or paddle $a$, $b$, $c$, $d$, $e$. At the points of intersection $5^a$, $5^b$, $5^c$, $5^d$, $5^e$ of the arms $1^a$, $1^b$, etc. with a circle K concentric with shaft O are pivoted levers $3^a$, $3^b$ ... $3^e$, respectively connected by two links $2^a$—$2^a$, $2^b$—$2^b$ ... $2^e$—$2^e$ with the corresponding wing, thus forming for each wing a deformable parallelogram $a$, $2^a$, $3^a$, $2^a$; $b$, $2^b$, $3^b$, $2^b$; etc. On the pivot axis $5^a$, $5^b$ etc. the levers $3^a$ etc. carry a respective right angular tail portion $4^a$, $4^b$, etc. Since levers $3^a$, $3^b$ etc. are parallel with the operative surfaces of the wings, the tail portions $4^a$, $4^b$, etc. are normal to these surfaces.

As the wheel rotates at a speed W and moves forward on a straight path at a speed V, its movement will be the equivalent of the rolling of a circle C upon a straight line D; each wing $a$, $b$, etc. will thus describe a cycloid such as A, and the theory and experience show that the dynamic reactions of the fluid upon the wings will have the optimum efficiency if the normals to the wings meet substantially at a common point $m$, which has a fixed position with reference to the shaft O; when this condition is fulfilled, the angles of incidence between the wings and the tangents $t_a$, $t_b$, etc. are such as to afford dynamic reactions $F_a$, $F_b$ etc. which may be decomposed into a component force parallel with D (propulsive force) and a perpendicular component directed upwardly (lifting force). It will be observed that the angle of incidence of wing $c$ with tangents $t_c$ is equal to zero, whereby the aerodynamic reaction on wing $c$ is equal to zero.

In order to comply with this condition, the middle lines of the tail parts $4^a$, $4^b$, $4^c$, should meet at a fixed point $m^1$ on the straight line $Om$, since the different triangles $8^aOm$, $5^aOm^1$—$8^bOm$, $5^bOm^1$ etc. are homothetic in pairs, and the ratios of the sides $8^a5^a : 5^aO$—$8^b5^b : 5^bO$, are equal.

Draw a circle L having O as a center, and, through the point of intersection $6^a$ of this circle with the arm $1^a$, draw a line $6^a7^a$ parallel with $Om^1$, which line meets the axis of tail part $4^a$ at $7^a$. A line parallel with $Om^1$ drawn through the point of intersection $6^b$ of circle L with arm $1^b$, will intersect the axis of tail part $4^b$ at $7^b$. It will be readily observed that the triangles $5^a6^a7^a$, $5^aOm^1$—$5^b6^b7^b$, $5^bOm^1$ etc. are homothetic in pairs and that the ratio of similitude $5^a6^a:5^aO$ is constant. All vectors $6^a7^a$, $6^b7^b$ etc. will thus be equal and parallel. The points $7^a7^b$ etc. may thus be considered as the new positions of the points $6^a6^b$ etc. when the circle L is imparted a motion of translation through the vector $O-O^1$, the new position of L being $L^1$.

If the axes of the several tail parts $4^a$, $4^b$ etc. are respectively made to pass constantly through points $6^a$, $6^b$ etc. of a circle L, and if this circle has imparted to it any straight motion, the axes of said tail parts $4^a$, $4^b$ etc. will cross at a common point $m^1$, and the normals to the wings will cross at a common point $m$.

In the practical construction of the apparatus, the tail parts $4^a$, $4^b$ etc. are guideways or slots in which are slidable rollers $7^a7^b$ etc. mounted on a rigid member adapted to be imparted a movement of translation in any desired direction with reference to shaft O.

A form of construction of such an apparatus is shown in Figures 2 and 3.

To the shaft O is keyed rotary member embodying a dish-shaped disk 11, to which is secured an annular dish-shaped member 12. Members 11 and 12 carry ball-bearings 13 for supporting pivot pins 14, extending through sleeves 15, secured to members 16 which are axially slotted and are pivoted at 17 to controlling rods 2. The above-mentioned parallelogram will be at once recognized, the sides 2, 17—14—17, 2 corresponding to the sides $2^a$, $3^a$ and $2^a$ of Fig. 1. Bearings 13 are arranged on a circle (corresponding to circle K of Figure 1).

The slots in members 16 cooperate with small rollers or ball-bearings 20, which are arranged on a circle (corresponding to circle L of Figure 1), and are mounted at the vertices of a shiftable pentagonal member consisting of two spaced parallel sheet metal pieces 21—22 (Fig. 3) holding between them the said rollers 20. The said metal pieces are secured to suitable flanges of a hub 23, having a large central aperture.

To provide for the motion of said shiftable member, (that is, of circle L, Figure 1) with reference to the disk 11, the sheet metal piece 21 is pivoted at 24—25 to links 26—27, in turn pivoted at 28—29 to an intermediate member 30. Links 26, 27 are parallel and of equal length, whereby member 21—22 can only assume rectilinear displacement with reference to member 30. This latter is pivoted at 31—32 to respective links 33—34 which are parallel to one another and of equal length, and are pivoted at 35—36 to disk 11, in such manner that it can only assume rectilinear displacements with reference to disk 11.

In this manner, any displacement imparted to hub 23 will cause a rectilinear motion of the shiftable member with reference to disk 11. On the other hand, since the slots of members 16 converge towards the center of shaft O when the shiftable member is concentric with this latter, it will be understood that the apparatus complies with the conditions specified with reference to Fig. 1.

The shiftable member is shifted off centre through the desired amount ($O-O^1$, Figure 1) and is held in position during the rotation of disk 11 by the following device (Fig. 4). On the hub 23 is formed an external roller race 40, cooperating with rollers 42, mounted in a ring 41, of U shaped cross-section, secured to horizontal guide bars 43—44 cooperating with slides 45—46 secured to a plate 47, in such manner that the ring 41 and the hub 23 can move horizontally with reference to plate 47. To the back of plate 47 are secured two vertical bars 48—49 cooperating with respective slides 50—51 secured to a stationary disk 52, in such manner that plate 47 is enabled to move vertically with reference to the disk 11.

Ring 41 is moved by means of two wires 60—61 which pass over respective pulleys 62—63, mounted on plate 47, said wires being attached to ring 41 at 64—65; plate 47 is moved upwardly by means of a wire 66 passing over a pulley 67 mounted on disk 52, said wire being attached to the plate 47 at 68, and downwardly by means of wires 60, 61, as hereinafter explained.

By drawing upon wire 66 and releasing wires 60—61, plate 47 is raised and with it the hub 23 and the shiftable member 21, 22; by drawing upon wires 60—61 and releasing wire 66, the said plate is lowered. When wire 66 is left stationary and wire 60 or wire 61 is drawn upon, this will draw the ring 41 and with it the shiftable member to the left or right, respectively.

From the foregoing, it will be understood that, under the control of wires 60—61—66, the shiftable member 21—22 may be shifted off center to the desired degree and in the desired direction, at any instant, in spite of the rotation of disk 11, the rollers 42 rolling upon the race 40.

The arrangement for the control of the wires by the pilot is as follows. Disk 52 (Fig. 6) is connected by cross-pieces 70 to a stationary support 71 of the aircraft body and is mounted on shaft O by means of a ball-bearing 72 (Fig. 3); said disk is pierced with apertures 73—74—75 through which the various wires issue from the casing formed by the stationary disk 52 and the movable members 11—12. Wire 66 proceeds thence upon a pulley 76 and upon a pulley $76^a$ mounted on a cross-piece 77 of support 71, to the aircraft body where it passes over various guiding pulleys, the last of which is shown at 78 (Fig. 7). Wire 66 is finally attached to the end of a longitudinal rocker arm 79, pivotally mounted on an upright 80, suitably positioned in the aircraft body.

Wires 60—61 pass upon respective pulleys 62—63 and are attached to the ends of a transverse rocker arm 64 which is pivoted about the axis of rocker arm 79 and is secured to a manual control lever 65.

The two branches of each rocker arm on either side of their axes of oscillation have the same length. Hence, starting from the mean position shown in Fig. 7, if the pilot depresses lever 65, rocker arm 79 will pivot about and will thus draw upon wire 66, at the same time releasing wires 60—61 by the same amount, thus raising the shiftable member 21—22. If he moves the lever 65 to the right or left, the shiftable member is shifted off centre correspondingly. The pilot is thus able, by a proper actuation of lever 65, to give the proper eccentricity to the shiftable member (and hence to the circle L of Figure 1) in any desired amount and direction.

In practice, in the case of an aircraft, the wings $a$ are mounted in the following manner: each wing has a depending flange 90 serving as a strengthening rib and to which are pivoted the rods 2—2 (Figs. 2 and 5). Said wing is pivotally mounted at 91 in a forked bracket 92, welded to a bent bar 93 which is the equivalent of arm 1 of Fig. 1 and is welded to the rotatable disk 11.

The engine (not shown) is mounted on the end of the shaft O and is secured to bracket 71, or it is arranged in the aircraft body, and connected with shaft O by any suitable driving gear.

The operation is as follows:

The engine being started with lever 65 in the position shown in Fig. 7, in which the shiftable member is concentric with shaft O, the wings will form equal angles with the tangents to the circle which they describe (or they are tangent to this circle), and the aerodynamic reactions are mutually equilibrated. There is no resultant.

In order to rise vertically from the ground, the pilot operates lever 65 in such manner as to gradually increase the eccentricity of the shiftable member in a direction such that the aerodynamic reaction on the wings will have a vertical resultant. The machine rises from the ground, and, when it reaches the desired height, the shiftable member is given a shifted off centre position in another direction, in such manner that the resultant of the aerodynamic forces will furnish both a lifting component and a propelling component. The intensity, direction and relative value of these components may be regulated at will by giving the proper degree of eccentricity to the shiftable member.

The machine is preferably provided with two like coaxial wheels, whereby the aircraft can be readily turned to one side by imparting different eccentricities to the wheels.

The aircraft can return to the ground with the engine stopped, in auto-rotation, and it can be again set in motion, when near the ground, in order to reduce the speed of the descent.

It will be noted that the lateral stability of this apparatus is considerable, due to the gyroscopic action which tends to straighten the machine when it turns to the side.

The aerodynamic qualities (such as the ratio lift : drag and the small coefficient of drag) are almost comparable with those of an aeroplane, but the great advantage of this apparatus consists in its greater stability and in the complete independence between the lift and the linear speed of travel of the aircraft.

Referring to Fig. 1, it will be observed that the angle of attack of the wing $d$ is relatively large, but as the distance between this wing and the instantaneous center of rotation P of the wheel is relatively small, there will be no risk of a serious disturbance. However, in the large machines operating at very high speed, it may be desirable to reduce said angle by somewhat departing from the rule of convergence of the normals to the wings.

Fig. 8 shows in dotted lines the position of the parts 3, 4, 5 and 7 of Fig. 1, and at $t^1_a$, $t^1_b$, $t^1_c$, the lines parallel with the tangents $t_a$, $t_b$, $t_c$ to the cycloids A, drawn through the points $5^a$, $5^b$, $5^c$, etc. Let it be supposed that the circle K is turned about O by a small angle $\alpha$, thus causing the tail parts $4a$, $4b$, etc. to pass through the points $7^a$, $7^b$, etc. The new position $3^{aa}$, $3^{bb}$ . . . $4^{aa}$, $4^{bb}$, etc. of the several parts is shown by the full lines. It will be seen that the displacement increases the smallest angles of incidence (wings $a$, $b$, $c$, $e$) and reduces the largest angle of incidence (wing $d$), so that the different angles of incidence can thus be maintained below a certain limit, and the rupture of the air streams can be obviated.

As the detrimental effect of an excessive angle of incidence increases as the speed of the wing upon its path, automatic means can be provided for reducing the greatest angle of incidence in proportion to the instantaneous speed of rotation of the corresponding wing, and this speed (for a constant speed of rotation of the wheel) increases as the distance between the wing and the instantaneous center P and the linear speed V are greater, i. e. as the eccentricity of the shiftable member is greater. Thus, the displacement can be automatically controlled according to the eccentricity of the shiftable member 21 by means of any suitable mechanical connection.

The angles of incidence may also be corrected by giving to the slots of the members 14 an asymmetrical shape with reference to their middle point. Thus in Fig. 9, a member 96 similar to member 16 of Fig. 2, is formed with a slot 97 consisting partly of a straight portion and partly of a curved portion; $x$ is the position of the roller when the shiftable member 21 is concentric with the shaft. If said member is shifted off center towards the top, the roller will slide in the curved part and will cause the member 96 to pivot in the direction of the arrow. In the diametrically opposite part of the wheel, the opposite roller slides in the straight part of the groove and does not change the angle which would be obtained with the member 16 of Fig. 2.

In Fig. 10, the groove 99 has the shape of a circular arc, and thus, for an upward eccentricity of the shiftable member, member 98 will turn in the direction of the arrow while the member situated in the diametrically opposite part of the wheel will also rotate in the same direction. This increases the angles of incidence of the upper wings and reduces those of the lower wings.

By a suitable choice of the shape of the groove, the law of proportionality between the displacement of the wings and the eccentricity of the shiftable member may be adequately modified.

Obviously, the invention is not limited to the aforesaid forms of construction, which are given solely by way of example.

Having now described my invention what I claim as new and desire to secure by Letters Patent is:—

1. A turbine wheel for working in a fluid in relative motion thereto, comprising in combination a rotary member, a number of oscillating members pivoted to said rotary member about axes substantially parallel to the axis of rotation of said rotary member, rigid members extending in a substantially radial direction and respectively pivoted to said oscillating members, cross-members respectively pivoted to said rotary member and to said rigid members, guide members rigidly secured to said cross-members respectively, guide-followers cooperating with said guide members, a common shiftable member carrying the various guide-followers, arranged in a circle on said common shiftable member, and means for shifting off centre said shiftable member with respect to said axis of rotation.

2. A turbine wheel for working in a fluid in relative motion thereto, comprising in combination a rotary member, a number of oscillating members pivoted to said rotary member about axes substantially parallel to the axis of rotation of said rotary member, rigid members extending in a substantially radial direction and respectively pivoted to said oscillating members, cross-members respectively pivoted to said rotary member and to said rigid members, guide members rigidly secured to said cross-members respectively, a shiftable member, guide-followers arranged in a circle on said shiftable member, and cooperating with said guide-members, an intermediate member, a deformable parallelogram connection between said rotary member and said intermediate member, a deformable parallelogram connection between said intermediate member and said shiftable member and means for shifting off centre said rotatable member with respect to said axis of rotation.

3. In a turbine wheel as claimed in claim 1, a circular casing portion secured to said rotary member, said guide members, said common shiftable member and said shifting off centre means being arranged within said casing.

4. A turbine wheel as claimed in claim 1, wherein said guiding members are adapted to guide said guide-followers, in a path which is asymmetrical with respect to the point in the middle of the length of said path.

In testimony whereof I have signed my name to this specification.

CARL BRUNO STRANDGREN.